United States Patent
Hancock et al.

(10) Patent No.: US 7,066,366 B2
(45) Date of Patent: *Jun. 27, 2006

(54) LONG GUN CARRYING SYSTEM FOR ALL TERRAIN VEHICLES

(75) Inventors: Dennis Hancock, Mountain Green, UT (US); Jeffrey D. Hancock, Uintah, UT (US)

(73) Assignee: Stearns Inc., Sauk Rapids, MN (US)

( * ) Notice: Subject to any disclaimer, the term of this patent is extended or adjusted under 35 U.S.C. 154(b) by 309 days.

This patent is subject to a terminal disclaimer.

(21) Appl. No.: 10/462,052

(22) Filed: Jun. 16, 2003

(65) Prior Publication Data

US 2004/0251288 A1    Dec. 16, 2004

(51) Int. Cl.
*B60R 9/00* (2006.01)

(52) U.S. Cl. .............. 224/401; 224/537; 224/547; 224/567; 224/571; 224/913

(58) Field of Classification Search ............... 224/401, 224/607, 913, 413, 408, 537, 547, 567, 571; 190/113, 902, 903; 206/317; 248/595; 42/106, 42/96

See application file for complete search history.

(56) References Cited

U.S. PATENT DOCUMENTS

| | | | |
|---|---|---|---|
| 553,614 A | 1/1896 | Handloser | |
| 1,008,604 A | 11/1911 | Lake | |
| 2,220,234 A | 11/1940 | Hadaway | |
| 2,274,605 A | 2/1942 | Hoffmeister | |
| 2,427,365 A * | 9/1947 | Meister | 269/152 |
| 2,708,088 A | 5/1955 | Steinke | |
| 2,947,052 A | 8/1960 | Michalsky | |
| 3,063,569 A | 11/1962 | Huber | |
| 3,082,713 A * | 3/1963 | Elgin | 109/82 |
| 3,096,960 A | 7/1963 | Kinney | |
| 3,237,899 A | 3/1966 | Lewis | |
| 3,266,633 A | 8/1966 | Graebner | |
| 3,294,247 A | 12/1966 | Norrington | |
| 3,361,265 A | 1/1968 | Wernimont | |
| 3,365,761 A | 1/1968 | Kalvig | |
| 3,501,074 A * | 3/1970 | Emerick | 224/606 |
| 3,701,371 A * | 10/1972 | Stackhouse | 206/317 |
| 3,701,436 A | 10/1972 | Adams | |
| 3,744,687 A | 7/1973 | Oreck | |

(Continued)

FOREIGN PATENT DOCUMENTS

GB     104044     2/1917

(Continued)

OTHER PUBLICATIONS

"Single Pack Rack®," *All Rite Products—Original ATV Gear*, http://www.allriteproducts.com/pr1.html, 1 page (Last printed Nov. 29, 2004).

(Continued)

*Primary Examiner*—Stephen K. Cronin
*Assistant Examiner*—Justin M. Larson
(74) *Attorney, Agent, or Firm*—Merchant & Gould P.C.

(57) ABSTRACT

A long gun carrying system for all terrain vehicles that incorporates a support structure that will mount on a rear deck or rack on an ATV and that will support a channel member to receive a soft gun case. The soft gun case is attached to the channel member and the soft gun case may be removed with a gun inside, from the channel member. Alternatively, the long gun is easily removed from the soft gun case, while leaving the gun case in position on the ATV.

19 Claims, 7 Drawing Sheets

U.S. PATENT DOCUMENTS

| | | |
|---|---|---|
| 3,860,209 A | 1/1975 | Strecker |
| 3,876,079 A | 4/1975 | Elkins et al. |
| D238,228 S | 12/1975 | Elkins et al. |
| 3,995,742 A | 12/1976 | Austin et al. |
| 4,025,015 A | 5/1977 | Kolic |
| 4,084,735 A | 4/1978 | Kappas |
| 4,108,313 A | 8/1978 | Bogar, Jr. |
| 4,247,030 A | 1/1981 | Amacker |
| 4,262,385 A | 4/1981 | Norman |
| 4,271,997 A | 6/1981 | Michael |
| 4,325,484 A | 4/1982 | Berry |
| 4,400,856 A | 8/1983 | Tseng |
| 4,429,638 A | 2/1984 | Licari |
| 4,450,989 A | 5/1984 | Bogar, Jr. |
| 4,470,179 A | 9/1984 | Gollin et al. |
| 4,566,660 A | 1/1986 | Anscher et al. |
| 4,597,496 A | 7/1986 | Kaplan |
| 4,599,920 A | 7/1986 | Schmid |
| 4,630,982 A | 12/1986 | Fenner |
| 4,691,887 A | 9/1987 | Bessinger |
| 4,776,471 A | 10/1988 | Elkins |
| 4,827,654 A | 5/1989 | Roberts |
| 4,841,839 A * | 6/1989 | Stuart .................. 89/37.04 |
| 4,881,386 A | 11/1989 | Glines |
| 4,915,273 A | 4/1990 | Allen |
| 4,958,758 A | 9/1990 | Tipple et al. |
| 4,991,723 A | 2/1991 | Elkins |
| 5,078,279 A | 1/1992 | Hancock et al. |
| 5,130,899 A | 7/1992 | Larkin et al. |
| 5,275,367 A | 1/1994 | Frye |
| 5,344,032 A | 9/1994 | Ramsdell |
| 5,370,240 A | 12/1994 | Hand |
| D357,802 S | 5/1995 | Todd et al. |
| D371,137 S | 6/1996 | Kriegh |
| 5,524,772 A | 6/1996 | Simmons |
| D386,298 S | 11/1997 | Hancock |
| D386,304 S | 11/1997 | Hancock |
| 5,697,181 A * | 12/1997 | Savant ..................... 42/94 |
| 5,706,990 A | 1/1998 | Lahrson |
| D397,403 S * | 8/1998 | Zebbedies ................ D22/108 |
| D400,782 S | 11/1998 | Nakamura |
| 5,878,929 A * | 3/1999 | Leonard ................... 224/401 |
| 5,893,502 A * | 4/1999 | Redzisz .................... 224/577 |
| 5,898,975 A | 5/1999 | Hancock |
| 5,915,572 A | 6/1999 | Hancock |
| 6,021,936 A * | 2/2000 | Savant .................... 224/401 |
| 6,032,911 A * | 3/2000 | Osborne ................ 248/309.1 |
| 6,142,349 A * | 11/2000 | Roberson ............... 224/401 |
| 6,206,261 B1 * | 3/2001 | McCrary ................ 224/562 |
| 6,216,986 B1 | 4/2001 | Kwilosz |
| 6,382,484 B1 * | 5/2002 | Savant .................... 224/401 |
| D459,625 S * | 7/2002 | Zebbedies ................ D6/552 |
| 6,457,618 B1 | 10/2002 | Hancock et al. |
| D466,856 S | 12/2002 | Gates et al. |
| 6,508,025 B1 * | 1/2003 | Du Plessis ................ 42/16 |
| D476,290 S | 6/2003 | Gates et al. |
| 6,588,637 B1 | 7/2003 | Gates et al. |
| 6,626,339 B1 * | 9/2003 | Gates et al. ............. 224/401 |
| 6,634,530 B1 * | 10/2003 | Black ..................... 224/401 |
| 6,637,707 B1 | 10/2003 | Gates et al. |
| 6,705,498 B1 * | 3/2004 | Gantert ................... 224/401 |
| 6,789,712 B1 | 9/2004 | Gates et al. |
| 6,793,109 B1 | 9/2004 | Gates et al. |
| 6,902,087 B1 * | 6/2005 | Hancock et al. ........... 224/401 |
| 2003/0042282 A1 | 3/2003 | Gates et al. |
| 2003/0146364 A1 | 8/2003 | Gates et al. |
| 2003/0168484 A1 | 9/2003 | Gates et al. |
| 2003/0218112 A1 | 11/2003 | Gates et al. |
| 2004/0020954 A1 | 2/2004 | Gates et al. |

FOREIGN PATENT DOCUMENTS

| | | |
|---|---|---|
| GB | 1040333 | 8/1966 |

OTHER PUBLICATIONS

"Pack Rack® Plus +," *All Rite Products—Original ATV Gear*, http://www.allriteproducts.com/prp1.html, 1 page (Last printed Nov. 29, 2004).

"Double Pack Rack®," *All Rite Products—Original ATV Gear*, http://www.allriteproducts.com/pr2.html, 1 page (Last printed Nov. 29, 2004).

"Pack Rack® Flat," *All Rite Products—Original ATV Gear*, http://www.allriteproducts.com/pr1f.html, 1 page (Last printed Nov. 29, 2004).

"The Magnum Pack Rack®," *All Rite Products—Original ATV Gear*, http://www.allriteproducts.com/mpr1.html, 1 page (Last printed Nov. 29, 2004).

"Graspur All Terrain Single," *All Rite Products—Original ATV Gear*, http://www.allriteproducts.com/AT1.html, 1 page (Last printed Nov. 29, 2004).

"Graspur All Terrain Double," *All Rite Products—Original ATV Gear*, http://www.allriteproducts.com/AT2.html, 1 page (Last printed Nov. 29, 2004).

"Tree Stand Pack Rack®," *All Rite Products—Original ATV Gear*, http://www.allriteproducts.com/TR1.html, 1 page (Last printed Nov. 29, 2004).

"All Terrain™ Treestand Rack," *All Rite Products—Original ATV Gear*, http://www.allriteproducts.com/ATT.html, 1 page (Last printed Nov. 29, 2004).

"All Terrain™ Kickboat Rack," *All Rite Products—Original ATV Gear*, http://www.allriteproducts.com/ATM1.html, 1 page (Last printed Nov. 29, 2004).

"All Terrain™ Truck Taped Gun/Bow Rack," *All Rite Products—Original ATV Gear*, http://www.allriteproducts.com/tt1.html, 1 page (Last printed Nov. 29, 2004).

"All Terrain™ Truck Suction Cup Gun/Bow Rack," *All Rite Products—Original ATV Gear*, http://www.allriteproducts.com/ts1.html, 1 page (Last printed Nov. 29, 2004).

"ATV Seefari® Monopod," *All Rite Products—Original ATV Gear*, http://www.allriteproducts.com/asm.html, 1 page (Last printed Nov. 29, 2004).

"V-rest attachment for Seefari™," *All Rite Products—Original ATV Gear*, http://www.allriteproducts.com/vrs.html, 1 page (Last printed Nov. 29, 2004).

\* cited by examiner

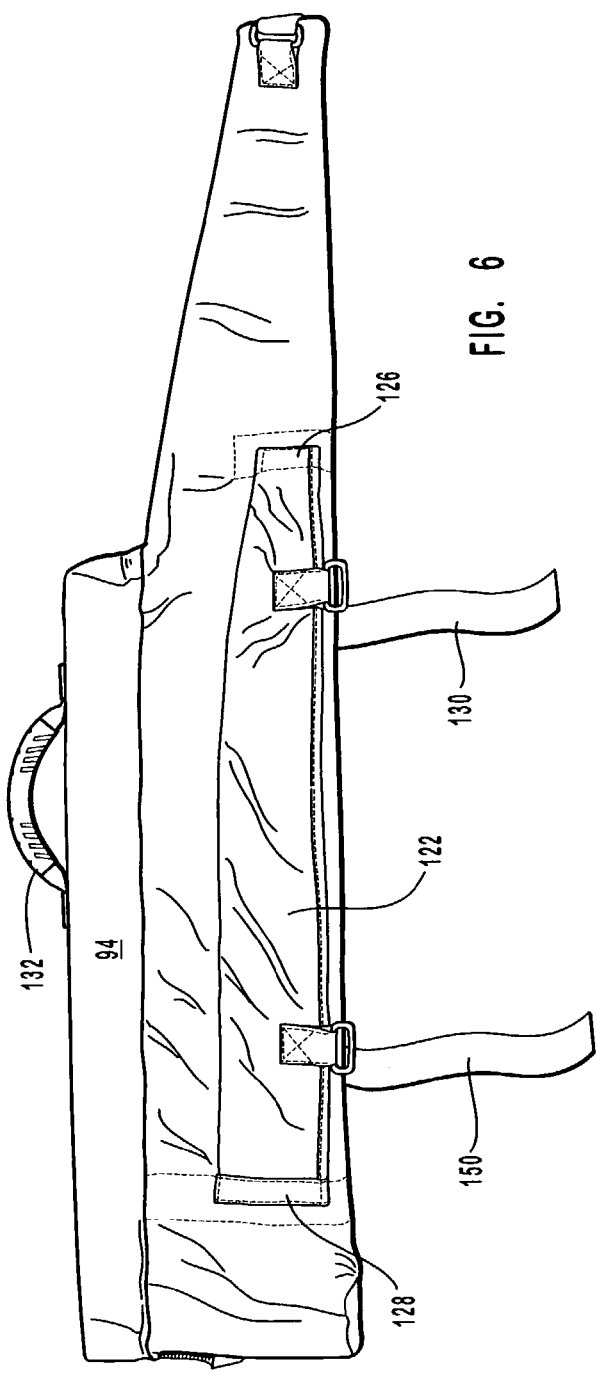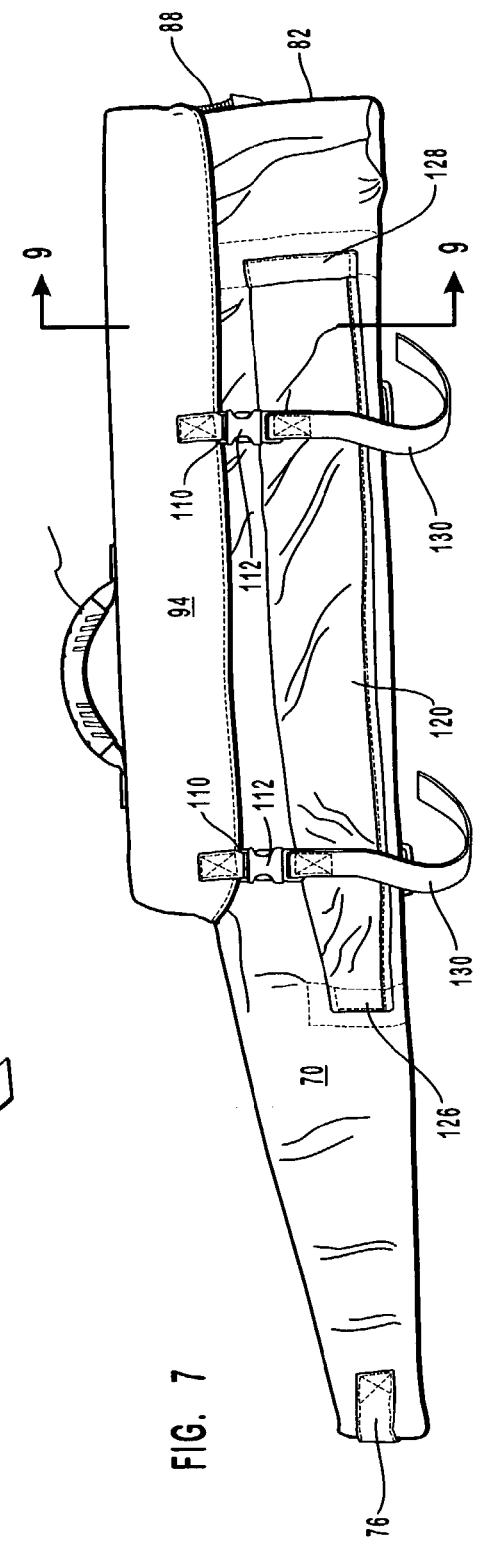

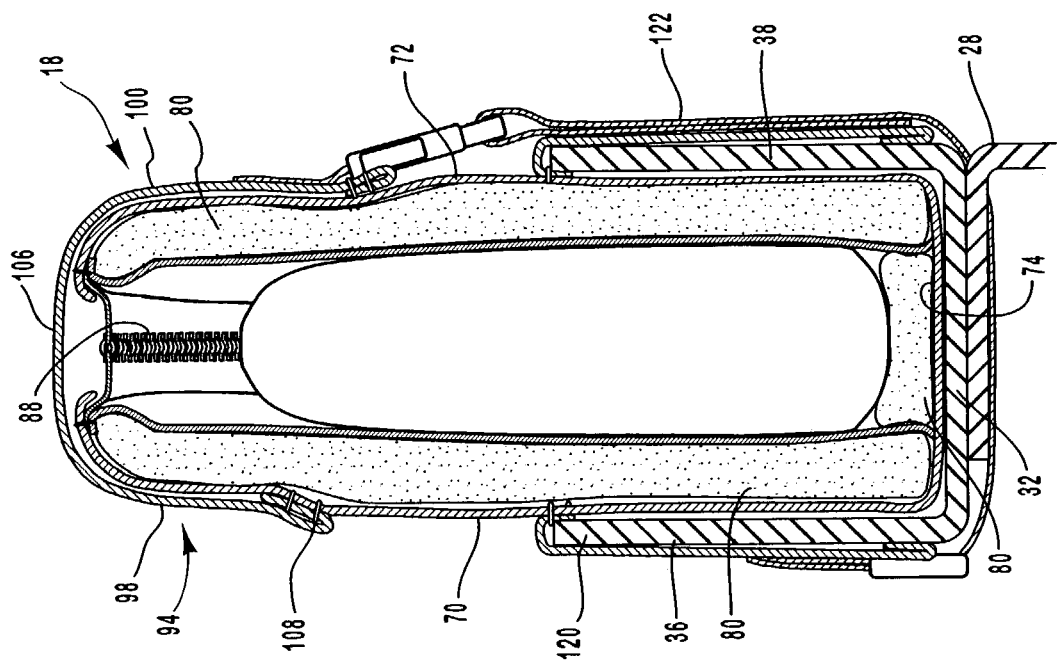

LONG GUN CARRYING SYSTEM FOR ALL TERRAIN VEHICLES

BACKGROUND OF THE INVENTION

1. Field of the Invention

This invention relates to a system for mounting and carrying long guns on all terrain vehicles. It is particularly concerned with providing for holding a long gun in a protected position such that the gun is available for easy removal and use. The system of the invention includes a support structure to mount on the rack on an all terrain vehicle (ATV), and that includes a channel member in which a soft gun ease rests.

This invention relates to apparatus for carrying long guns on ATV's. The invention further relates to soft gun cases suitable for carrying long guns on or off an ATV.

2. Description of the Related Art

In the past it has been common to carry long guns on ATV's by securing them to the support racks of the vehicles or by positioning them, in mounts, across the handlebars of the vehicles. Other support systems have been proposed that use solid or hard gun cases that will mount to the vehicle, but such hard cases are subject to breakage and do not properly protect a gun stored in therein.

BRIEF SUMMARY OF THE INVENTION

The present Invention provides a system that will carry a long gun on an ATV, such that the gun is immobilized in a soft case and is held in a position allowing either the long gun and soft case to be on just the gun itself to be easily retrieved by an operator. The soft gun case is mounted in a channel member that is supported by a bracket assembly, which will attach to the rear platform of an ATV. The bracket assembly can be attached to extend outwardly of either side of the platform. As a result, a pair of soft gun cases can be supported at opposite sides of the vehicle and the entire mounting system does not prevent other items being stored on the rear platform or rack of the vehicle. The soft gun case is mounted in the channel in such a manner as to preclude forward and reverse movement of the gun case and the soft gun case is constructed to allow easy removal of the gun contained therein and full protection of the gun during the time the gun is within the case.

Principal objects of the present invention are to provide a soft gun case for the storage and transportation of a long gun, i.e., rifle or shotgun.

Other objects of the present invention are to provide a gun case that will hold a long gun such that either the gun case with gun, or the gun without soft gun case can be easily installed on and removed from an ATV.

Another object is to provide a soft gun case that will protect any of a wide variety of types of long guns.

Still another object of the invention is to provide support means for a soft gm case that will attach to many different types of ATV's and that does not utilize the support space normally found on the front or rear rack of an ATV.

Another object is to provide a support bracket interconnecting the rear deck or rack of an ATV with the soft gun case and providing support throughout a large portion of the length of the soft gun case.

Another object of the invention is to provide a support for a soft gun case that will allow the positioning of guns of different shapes and types and even including guns with projecting bolt handles to be carried on the ATV.

Still another object is to provide a soft gun case that will receive long guns of various types to be supported on an ATV and that will effectively prevent dirt, moisture and the like, entering into the gun case to damage a gun placed therein.

Another object is to provide a support structure for the soft gun case that will hold the soft gun case in its gun receiving and holding configuration even if the gun is removed.

Yet another object is to provide a support structure for the soft gun case that will hold the soft gun case in a desired angle or position and that will preclude forward or reverse movement of the soft gun case during storage or travel of a gun placed in the case.

Still another object is to provide a support structure for the soft gun case that is readily attached to the rear platform or rack of an ATV and that will permit the angle of the gun case to be set, as desired, by the ATV operator. The gun case is made of strong, durable, fabric material, such as nylon and is flexible to accommodate a wide variety of different kinds of long guns. For example, it will accommodate shotguns of various kinds and types and rifles, including those having operating bolts projecting from either a right or left side of the gun.

Principal features of the long gun carrying system of the invention include a mounting plate to attach to the rear deck or rack of an ATV. The mounting plate supports a channel member beyond a side of the ATV and the angle of the channel member may be varied with respect to the rear deck or rack of the ATV.

The channel member has a pair of sidewalls interconnected by a web. Each of the sidewalls has a notch formed intermediate its length.

The soft gun case of the system includes a handle that allows the gun case to be transported or moved by hand. The soft gun case is made of durable fabrics, such as nylon and is made to have a zipper top through which a long gun is inserted into the case. The soft gun case fits into the channel member and is secured thereto by straps attached to the soft gun case and passed around the channel member. Pockets on opposite sides of the soft gun case extend downwardly over the sidewalls of the channel member and the pockets are closed at opposite ends so that the gun case cannot slide relative to the channel member when the gun case is inserted in the channel member.

The soft gun case is sufficiently flexible to accept long guns of different shapes and types. The notches formed in the sides of the channel allow the gun case to project beyond the sides of the channel when a gun having a bolt handle projecting outwardly from the side of the gun is placed in the soft gun case.

Entrance to the soft gun case is made through a zippered opening in the top of the soft gun case. The zippered opening extends from intermediate the length of the soft gun case to a back end of the soft gun case. A semi-rigid top cover pivots from one side of the soft gun case over the zippered portion of the gun case and is locked in place with straps connecting the cover and outside surface of the soft gun case. A portion of the soft gun case containing the top zipper extends upwardly beyond the upper portion barrel receiving end of the gun case so that as a gun is positioned in the case, barrel first, the gun stock can be pivoted down into the larger portion of the soft gun case. With the top cover made of semi-rigid material it is easily folded over the zipper portion and protects the zipper against dirt and moisture. The semi-rigid top flap also provides mounting structure for a handle located intermediate the length of the soft gun case.

When the soft gun case is unstrapped from the channel member and is removed, it is easily carried using the handle to any desired location.

The principal features of the invention further include a support structure that will readily adapt to mounting on a rear deck or rack of an ATV and that will adapt to use on ATV's of various makes and manufacturers. The adaptor includes a flat plate that is bolted to the deck or rack of the ATV and an upwardly extending lip that is bolted to a corresponding plate extending downwardly from a channel in which a soft gun case is positioned. A plurality of bolt holes are provided to allow the upright plate and corresponding downwardly extending plate to be positioned at selected angles.

The downwardly projecting plate extends from the bottom of a channel member having opposite sides projecting upwardly from a web plate to which the downwardly extending plate is fixed. The walls of the channel member are notched intermediate the length of the walls. A soft gun case is dimensioned to have a bottom that will fit into a channel member. Pockets formed at opposite sides of the soft gun case fit over the upstanding walls of the channel member such that the ends of the pockets prevent slippage of the soft gun case with respect to the channel member. Straps on the soft gun case are passed beneath the channel member to secure the soft gun case in the channel member.

The soft gun case has a zippered top opening extending from intermediate the length of the soft gun case to the rear of the gun case and raised above a front end portion of the soft gun case that receives the muzzle end of a long gun placed in the case. The zipper for the zipper opening of the soft gun case extends beyond the rear of the case so that rear of the case is fully open to better facilitate insertion of the gunstock as the gun is positioned in the soft gun case. A top cover is pivotally connected to the soft gun case and pivots over the top of the zipper, including the extended portion of the zipper, and is held in place by straps on the soft gun case. The top cover prevents the entry of dust, moisture, and the like into the soft gun case when the gun is being transported or stored.

The top cover preferably is made with semi-rigid side, front, rear and top walls so that it will easily swing into position off of and onto the top of the soft gun case.

Other objects and features of the invention will become apparent to those skilled in the art to which the invention pertains from the following detailed description and drawings, disclosing what is presently contemplated as being the best mode of the invention.

BRIEF DESCRIPTION OF THE DRAWINGS

In the drawings:

FIG. 6 is a side elevation of the soft gun case of the system of the invention;

FIG. 7 is a side elevation view of the opposite side of the soft gun case;

FIG. 8 is a perspective taken from the front and slightly above the soft gun case; and FIG. 9 is an enlarged sectional view taken on the line 9—9 of FIG. 7.

DETAILED DESCRIPTION

Figure 1:
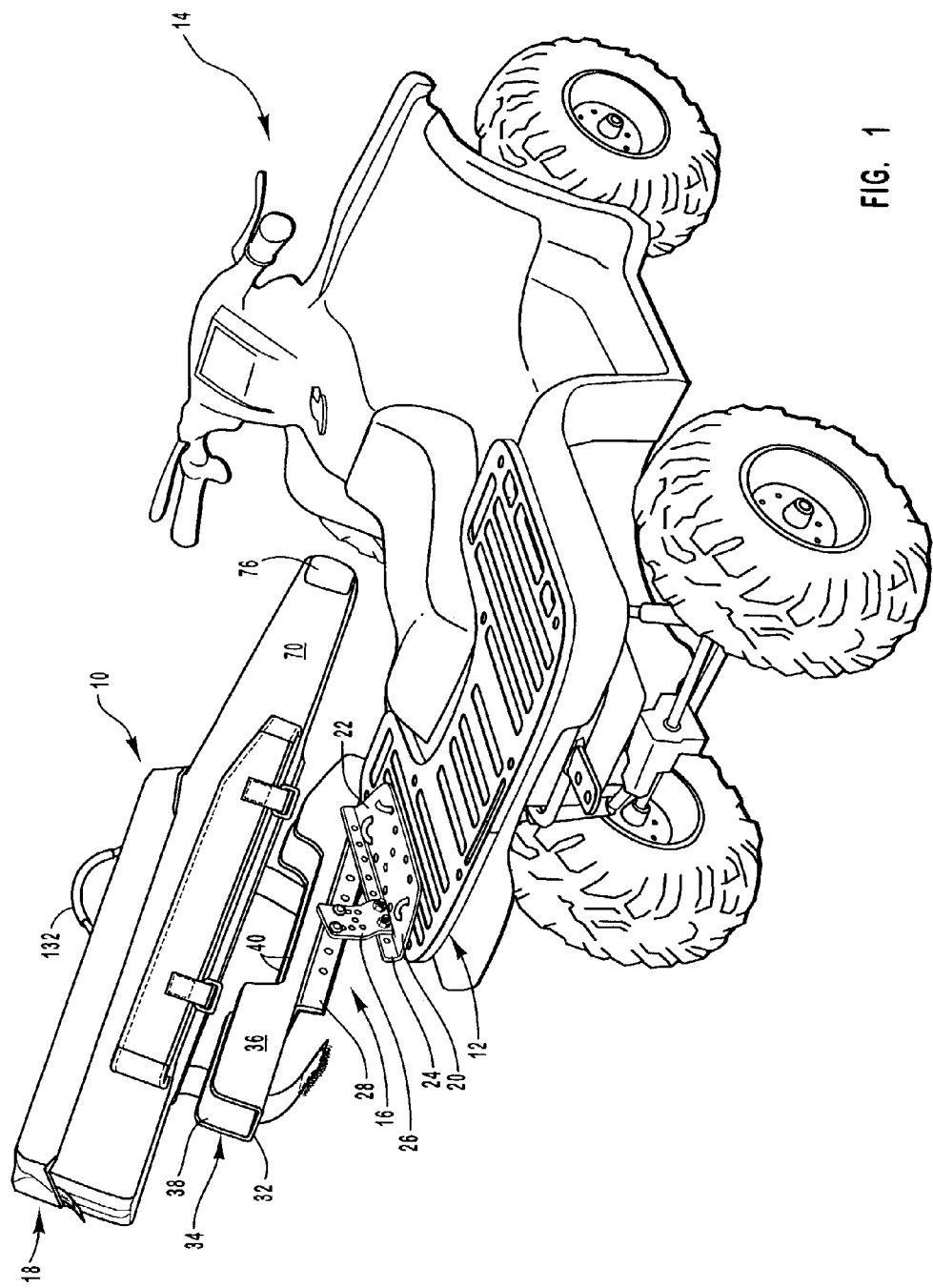
FIG. 1 is a perspective view showing a gun carrying support system of the invention as it is mounted on an ATV, but with the soft gun case separated from the channel member.
Figure 2:
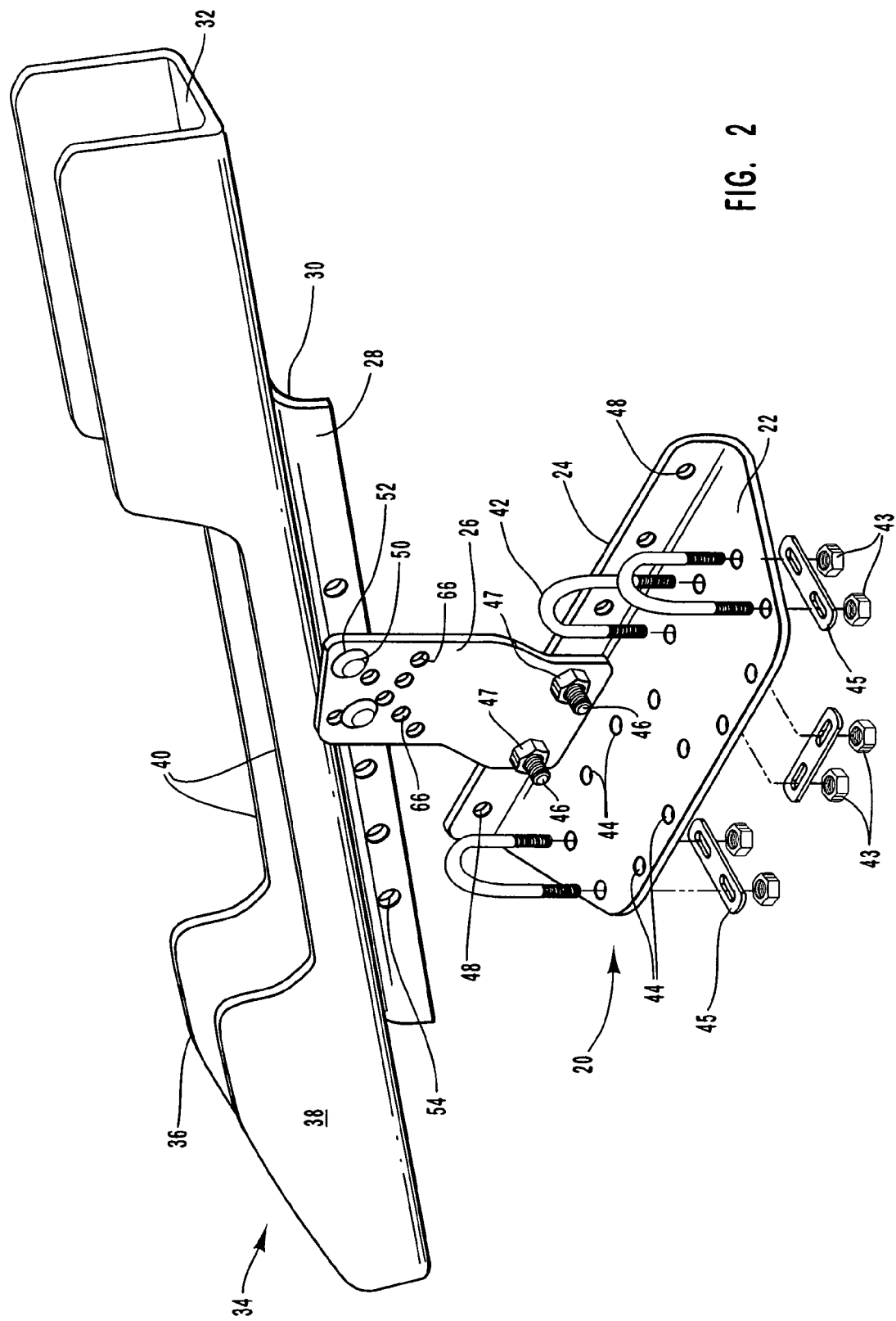
FIG. 2 is an enlarged perspective view of the support structure for the soft gun case.
Figure 3:
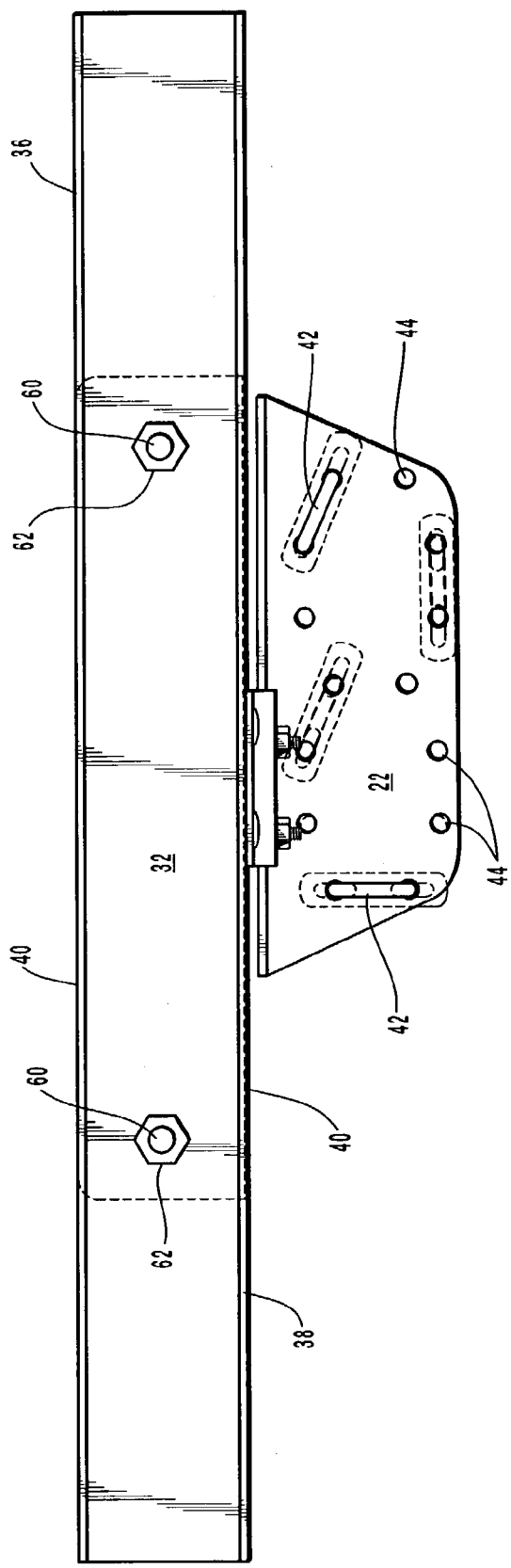
FIG. 3 is a top plan view of the support structure shown in FIG. 2.
Figure 4:
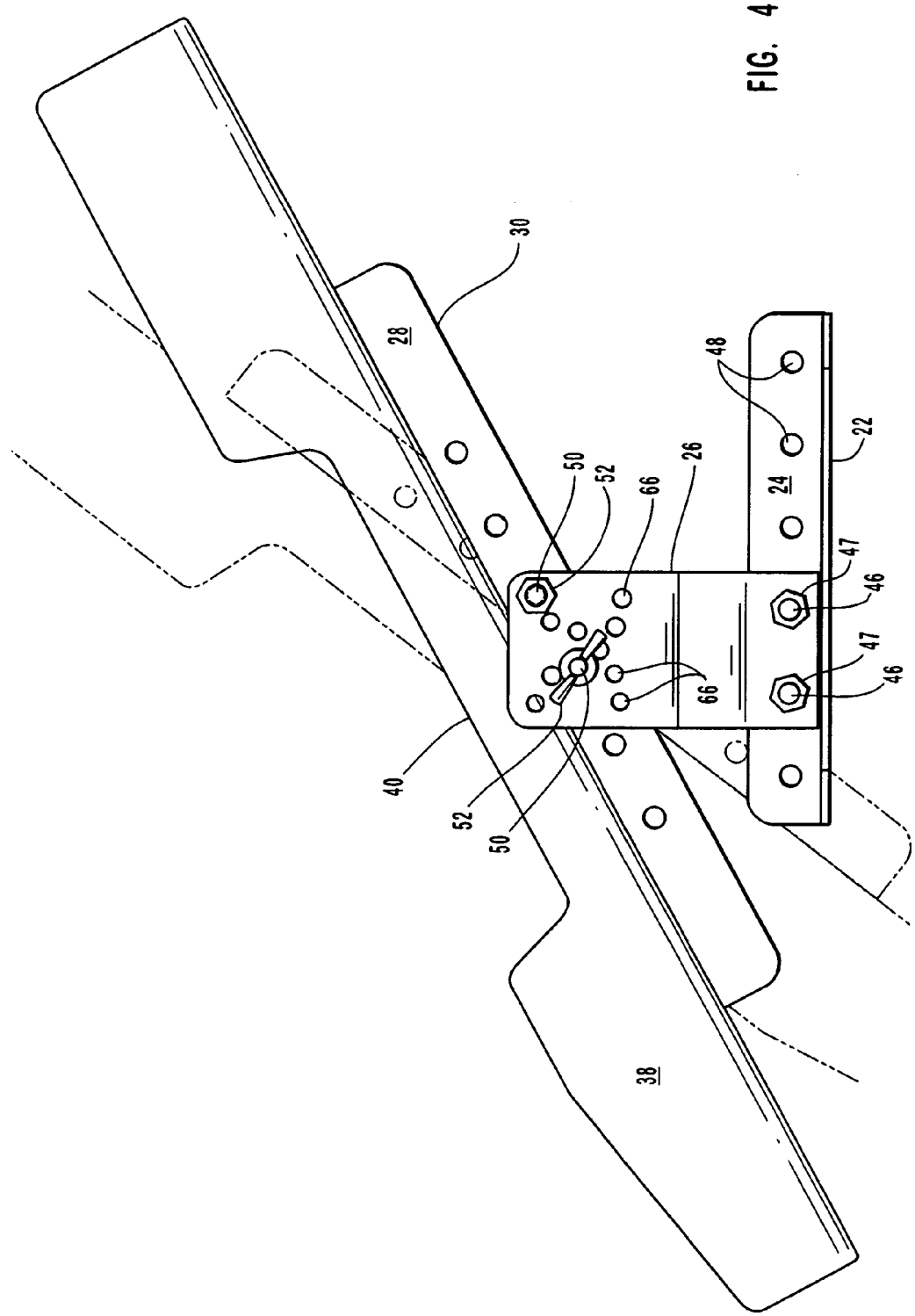
FIG. 4 is an elevation view, with an alternate position of the channel member shown in phantom.
Figure 5:
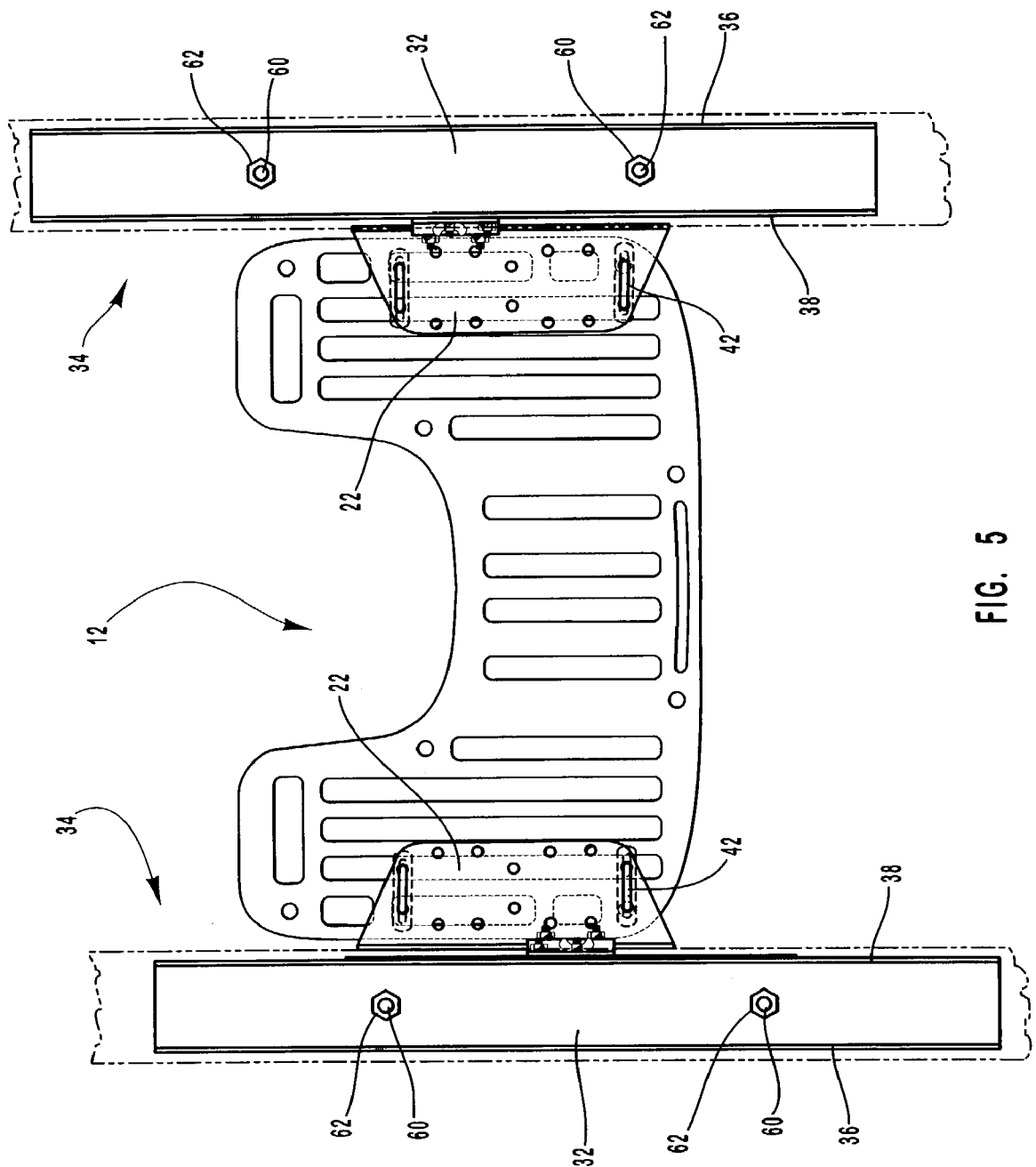
FIG. 5 is a top plan view of the rear deck or rack of an ATV with a pair of support structures for the soft gun case of the invention at opposite sides of the deck or rack.

Referring now to the drawings:

In the illustrated preferred embodiment, the long gun carrying system of the invention is shown generally at 10, mounted to the rear deck or rear rack 12 of an ATV, shown generally at 14. The long gun carrying system includes a support structure, shown at 16, that receives a soft gun case 18.

The support structure for the soft gun case 18 includes a mounting plate 20, with a flat surface 22 having multiple holes there through, to receive U-bolts that are each inserted through two openings in the rear deck or rack of the ATV. The U-bolts 42 secure the plate 20 to the rear deck or rack. Plate 20 has an upturned flange 24 that has one end of the upright plate 26 bolted thereto. The other end of plate 26 is bolted to a downwardly turned flange 28 of an attachment member 30 that is bolted to a web 32 forming part of a channel 34. The channel member 34 further includes a pair of spaced apart sidewalls 36 and 38 and each of the sidewalls is notched at 40, intermediate the length of the sidewall.

The U-bolts 42 are inserted through holes in the flat plate 22 to secure the flat plate to the rear deck or rear rack of the ATV 14 The U-bolts are inserted through selected ones of a large number of holes 44 in the flat plate 22 and the large number of holes 44 allow the flat plate to be mounted on a wide variety or types of ATV's. It is most desirable that when the flat plate 22 is secured to the ATV the upstanding lip 24 is positioned outwardly of the rear deck or rack of the ATV.

Bolts 46 are used to secure the upright plate 26 to the lip 24 and these bolts are inserted through selected holes 48 in the upturned lip and are secured with nuts 47. The variety of holes again allows for the support structure to be modified to best fit different kinds and types of ATV's. The opposite end of upright plate 26 is secured to the downwardly extending portion of attachment plate 28 by bolts 50 inserted through selected holes in the upright plate 26 that are used to secure the upright plate 26 to selected hole 54 in attachment plate 28. Nuts 52 secure the bolts 50 in place.

Attachment plate 28 is secured by bolts 60 and nuts 62 to the web 32 of the channel member 34.

The arcuate and crossing pattern of the holes 66 through the upright plate 26 allows the bolts 50 to be inserted as the channel member is pivoted angularly up or down and at either side of an ATV to which the unit assembly is attached. Nuts 52 secure bolts 50 in place.

Soft gun case 18 includes a pair of sidewalls 70 and 72 interconnected by a bottom 74. Sidewalls 70 and 72 extend the full length of the gun case and are tapered to a muzzle end 74. A reinforcement member 76 is wrapped around the end 74 and is sewn to the sidewalls. Flexible foam material cushions 80 are provided inside of each sidewall and bottom to firmly engage the long gun placed inside the soft gun case. Sidewalls are curved upwardly at 82 to form an entryway into the soft gun case. The sides 70 and 72 are extended upwardly at 84 and 86 and the opening formed at the top between the sides is closed by a zipper 88. The zipper extends beyond the rear end 90 of the soft gun case.

When the zipper 88 is open, it is a simple manner to insert a long gun into soft gun case 18. This is done by inserting the barrel end of the gun through the opening at the top of the soft gun case and into the muzzle receiving portion of the soft gun case and then pivoting the stock of the gun down through the opening into the soft gun case.

A lid 94 is pivotally connected to the wall 70 of the soft gun case and includes spaced apart sidewalls 98 and 100 interconnected by spaced apart end walls 102 and 104 and a top wall 106. Lid 94 is pivotally connected at 108 to the wall 70. Interconnecting couplers 110 and 112 respectively attached to straps on the lid and the ball of the soft gun case are used to hold the lid securely in position over the zipper assembly 88.

Pockets 120 and 122 are formed on opposite sides of the soft gun case and each pocket is sewn at ends 126 and 128 while remaining open at a bottom edge. In use, when the soft gun assembly 18 is positioned within the channel member 34, pocket 120 fits over sidewall 36 of the channel member. At the same time, pocket 22 fits over the sidewall member 38 of the channel member. Once the pockets are installed over the sidewalls of the channel member the sewn ends 126 and 128 of the pockets prevent sliding of the soft gun case 18 with respect to the channel member.

Straps 130 are then passed beneath the channel member and are secured to hold the soft gun case in position, in the channel member.

A handle 132 is attached to the top of the lid and provides means for carrying of the soft gun case when it is released from the channel member.

Although a preferred form of our invention has been herein disclosed, it is be understood that the present disclosure is by way of example and that variations are possible without departing from the subject matter coming within the scope of the following claims, which subject matter we regard as our invention.

We claim:

1. A long gun carrying system for an all terrain vehicle, the system comprising:
   a support structure including means for securement to a rack of the all terrain vehicle;
   a channel member carried by said support structure;
   a soft long gun case having a bottom fitting snugly in the channel member; and
   strap means for securing said soft gun case in said channel member, said strap means including a strap that extends around a bottom side of said channel member and is secured to opposing sides of said soft gun case.

2. A long gun carrying system as in claim 1, wherein the support structure includes a first plate that rests on the rack of the all terrain vehicle; a second plate projecting downwardly from the channel member, and an upstanding plate interconnecting said first plate and said second plate.

3. A long gun carrying system as in claim 2, wherein the channel member includes spaced apart upstanding sidewalls interconnected by a web member.

4. A long gun carrying system for all terrain vehicles as in claim 3, further including a notch in each sidewall intermediate the length of the wall to accommodate guns in the soft gun case having projecting bolt handles.

5. A long gun carrying system for all terrain vehicles as in claim 4, further including pockets on opposite sides of the soft gun case to fit over the upstanding sidewalls of the channel member.

6. A long gun carrying system as in claim 1, wherein the soft long gun case includes a smaller muzzle end and an enlarged stock receiving area, said gun case being curved at the junction of the muzzle end and the enlarged stock end to accommodate insertion of the muzzle of a long gun and pivoting of the stock of the long gun about the curved portion of the gun case into and out of the gun case.

7. A long gun carrying system as in claim 5, further including an opening into the gun case at a top of the enlarged stock portion of the gun case; and a zipper extending the length of the opening.

8. A long gun carrying system as in claim 7, further including a lid pivotally connected to a side of the soft gun case and pivotal over the zipper.

9. A long gun carrying system as in claim 8, wherein the soft long gun case is constructed of a durable fabric and has a foam liner to engage a gun placed therein.

10. A long gun carrying system as in claim 9, wherein the lid is formed of a semi-rigid material.

11. A long gun carrying system for use with an all terrain vehicle, the system comprising:
    a support structure including a first plate secured to a rack of the all terrain vehicle;
    a channel member carried by the support structure; and
    a soft long gun case mounted in the channel member;
    wherein the channel member includes spaced apart upstanding sidewalls interconnected by a web member, the sidewalls extending along a length of the channel member between opposing ends of the channel member; and wherein each sidewall includes a notch formed therein intermediate the length of the wall, the notch extending from a top edge of the sidewall towards the web member.

12. The system of claim 11, further including pockets on opposite sides of the soft gun case to fit over the upstanding sidewalls of the channel member.

13. The system of claim 11, further comprising a securing member that extends around a bottom side of the channel member and is secured to opposing sides of the soft gun case.

14. A long gun carrying system for use with an all terrain vehicle, the system comprising:
    a support structure including a first plate secured to a rack of the all terrain vehicle, a second plate projecting downwardly from a channel member, and an upstanding plate interconnecting the first plate and the second plate,
    the channel member carried by the support structure; and
    a soft long gun case mounted in the channel member, the soft gun case including an opening into the gun case along a top side of the gun case that extends along a length of the gun case, a zipper extending the length of the opening, and a lid pivotally connected to a side of the soft gun case and pivotal over the zipper.

15. The system of claim 14, wherein the soft long gun case is constructed of a durable fabric and has a foam liner to engage a gun placed therein.

16. The system of claim 14, wherein the lid comprises a semi-rigid material embedded in a form liner.

17. The system of claim 14, wherein the channel member includes spaced apart upstanding sidewalls interconnected by a web member, the sidewalls extending along a length of the channel member between opposing ends of the channel member.

18. The system of claim 17, wherein each sidewall includes a notch formed therein intermediate the length of the wall, the notch extending from a top edge of the sidewall towards the web member.

19. The system of claim 14, further comprising a securing member that extends around a bottom side of the channel member and is secured to opposing sides of the soft gun case.

* * * * *